(12) United States Patent
Saito

(10) Patent No.: US 7,730,324 B2
(45) Date of Patent: Jun. 1, 2010

(54) METHOD FOR CONTROLLING DATABASE COPYRIGHTS

(76) Inventor: Makoto Saito, 2-12-6-104, Kaitori, Tama-shi, Tokyo (JP)

( * ) Notice: Subject to any disclaimer, the term of this patent is extended or adjusted under 35 U.S.C. 154(b) by 1613 days.

(21) Appl. No.: 09/985,279

(22) Filed: Nov. 2, 2001

(65) Prior Publication Data

US 2002/0021807 A1 Feb. 21, 2002

(30) Foreign Application Priority Data

Apr. 1, 1994 (JP) .................................. 6-064889

(51) Int. Cl.
G06F 11/30 (2006.01)
(52) U.S. Cl. .................. 713/191; 726/2; 726/4; 707/9
(58) Field of Classification Search .......... 713/1–2, 713/188, 194, 200–201, 202, 191; 710/1–3; 711/101–104; 707/1, 9, 10; 380/200, 201, 380/255, 277; 726/2, 4–7
See application file for complete search history.

(56) References Cited

U.S. PATENT DOCUMENTS

| | | | |
|---|---|---|---|
| 4,104,721 A * | 8/1978 | Markstein et al. ........... 711/164 |
| 4,168,396 A | 9/1979 | Best | |
| 4,225,884 A | 9/1980 | Block et al. | |
| 4,278,337 A | 7/1981 | Mashimo | |
| 4,278,837 A | 7/1981 | Best | |
| 4,352,952 A | 10/1982 | Boone et al. | |
| 4,386,233 A | 5/1983 | Smid et al. | |
| 4,423,287 A * | 12/1983 | Zeidler ........................ 705/71 |
| 4,465,901 A | 8/1984 | Best | |
| 4,527,195 A | 7/1985 | Cheung | |
| 4,558,176 A | 12/1985 | Arnold et al. | |

(Continued)

FOREIGN PATENT DOCUMENTS

DE 3717261 11/1987

(Continued)

OTHER PUBLICATIONS

"Encryption of Information to be Recorded so as to Prevent Unauthorized Playback," Research Disclosure No. 335, Mar. 1992, Emsworth GB, p. 219 XP 000301128.

(Continued)

*Primary Examiner*—Kimyen Vu
*Assistant Examiner*—Joseph Pan

(57) ABSTRACT

The present invention provides a method for controlling copyrights of digital data in a database system including real time transmission of a digital picture. Copyrights are controlled using one or more of the following, as necessary, in addition to a permit key: a copyright control program, copyright information or copyright control message. The copyright control program, the copyright information and the copyright control message are supplied together with the data, the permit key, or they are supplied together with the data. Otherwise, a part of them is supplied together with the permit key and the other part of them is supplied together with the data. The data, the permit key, the copyright control message, the copyright information and the copyright control program are (1) transmitted while encrypted, but are decrypted when used, or (2) they are transmitted while encrypted and decrypted for display only, otherwise remaining encrypted, or (3) they may not be encrypted at all.

35 Claims, 4 Drawing Sheets

U.S. PATENT DOCUMENTS

| | | | |
|---|---|---|---|
| 4,567,512 A | 1/1986 | Abraham | |
| 4,588,991 A | 5/1986 | Atalla | |
| 4,613,901 A | 9/1986 | Gilhousen et al. | |
| 4,623,918 A | 11/1986 | Chomet | |
| 4,709,266 A | 11/1987 | Hanas et al. | |
| 4,710,955 A | 12/1987 | Kauffman | |
| 4,736,422 A | 4/1988 | Mason | |
| 4,751,732 A | 6/1988 | Kamitake | |
| 4,757,534 A | 7/1988 | Matyas et al. | |
| 4,759,062 A | 7/1988 | Traub et al. | |
| 4,791,565 A | 12/1988 | Dunham | |
| 4,796,220 A | 1/1989 | Wolfe | |
| 4,799,156 A | 1/1989 | Shavit et al. | |
| 4,817,140 A | 3/1989 | Chandra et al. | |
| 4,827,508 A * | 5/1989 | Shear | 705/53 |
| 4,829,569 A | 5/1989 | Seth-Smith et al. | |
| 4,850,017 A * | 7/1989 | Matyas et al. | 380/280 |
| 4,852,154 A | 7/1989 | Lewis et al. | |
| 4,862,268 A | 8/1989 | Campbell et al. | |
| 4,864,494 A | 9/1989 | Kobus, Jr. | |
| 4,864,614 A | 9/1989 | Crowther | |
| 4,864,615 A | 9/1989 | Bennett et al. | |
| 4,890,319 A | 12/1989 | Seth-Smith et al. | |
| 4,890,321 A | 12/1989 | Seth-Smith et al. | |
| 4,905,277 A | 2/1990 | Nakamura | |
| RE33,189 E | 3/1990 | Lee et al. | |
| 4,916,737 A | 4/1990 | Chomet et al. | |
| 4,919,545 A | 4/1990 | Yu | |
| 4,933,969 A | 6/1990 | Marshall et al. | |
| 4,977,594 A | 12/1990 | Shear | |
| 4,995,080 A | 2/1991 | Bestler et al. | |
| 5,008,853 A | 4/1991 | Bly et al. | |
| 5,029,207 A | 7/1991 | Gammie | |
| 5,034,980 A | 7/1991 | Kubota | |
| 5,036,461 A | 7/1991 | Elliott et al. | |
| 5,046,093 A | 9/1991 | Wachob | |
| 5,060,262 A | 10/1991 | Bevins, Jr. et al. | |
| 5,077,665 A | 12/1991 | Silverman et al. | |
| 5,083,309 A | 1/1992 | Beysson | |
| 5,091,938 A | 2/1992 | Thompson et al. | |
| 5,103,476 A | 4/1992 | Waite et al. | |
| 5,113,518 A | 5/1992 | Durst, Jr. et al. | |
| 5,126,566 A | 6/1992 | Shimada | |
| 5,138,659 A | 8/1992 | Kelkar et al. | |
| 5,142,579 A | 8/1992 | Anderson | |
| 5,144,663 A | 9/1992 | Kudelski et al. | |
| 5,146,497 A | 9/1992 | Bright | |
| 5,157,726 A | 10/1992 | Merkle et al. | |
| 5,163,096 A | 11/1992 | Clark et al. | |
| 5,173,939 A | 12/1992 | Abadi et al. | |
| 5,191,611 A | 3/1993 | Lang | |
| 5,204,961 A * | 4/1993 | Barlow | 713/201 |
| 5,220,604 A | 6/1993 | Gasser et al. | |
| 5,224,163 A | 6/1993 | Gasser et al. | 380/30 |
| 5,227,893 A | 7/1993 | Ett | |
| 5,235,641 A | 8/1993 | Nozawa et al. | |
| 5,247,575 A | 9/1993 | Sprague et al. | |
| 5,270,773 A * | 12/1993 | Sklut et al. | 399/20 |
| 5,291,598 A | 3/1994 | Grundy | |
| 5,301,245 A | 4/1994 | Endoh | |
| 5,313,521 A | 5/1994 | Torii et al. | |
| 5,315,657 A | 5/1994 | Abadi et al. | |
| 5,319,705 A * | 6/1994 | Halter et al. | 705/54 |
| 5,323,464 A | 6/1994 | Elander et al. | |
| 5,341,425 A | 8/1994 | Wasilewski et al. | |
| 5,343,527 A | 8/1994 | Moore | |
| 5,345,508 A | 9/1994 | Lynn et al. | |
| 5,347,581 A | 9/1994 | Naccache et al. | |
| 5,349,662 A | 9/1994 | Johnson et al. | |
| 5,353,351 A | 10/1994 | Bartoli et al. | |
| 5,361,091 A | 11/1994 | Hoarty et al. | |
| 5,369,702 A | 11/1994 | Shanton | |
| 5,375,240 A | 12/1994 | Grundy | |
| 5,381,480 A | 1/1995 | Butter et al. | |
| 5,390,297 A | 2/1995 | Barber et al. | |
| 5,392,351 A | 2/1995 | Hasebe et al. | |
| 5,400,403 A | 3/1995 | Fahn et al. | 380/21 |
| 5,410,602 A | 4/1995 | Finkelstein et al. | |
| 5,414,772 A | 5/1995 | Naccache et al. | |
| 5,428,606 A | 6/1995 | Moskowitz | |
| 5,428,685 A | 6/1995 | Kadooka | |
| 5,438,508 A | 8/1995 | Wyman | |
| 5,442,541 A | 8/1995 | Hube et al. | |
| 5,442,706 A | 8/1995 | Kung | |
| 5,444,779 A | 8/1995 | Danielle et al. | 713/179 X |
| 5,444,782 A | 8/1995 | Adams, Jr. et al. | |
| 5,450,493 A | 9/1995 | Maher | |
| 5,453,601 A | 9/1995 | Rosen | |
| 5,455,863 A | 10/1995 | Brown et al. | |
| 5,455,941 A | 10/1995 | Okuno et al. | |
| 5,457,746 A | 10/1995 | Dolphin | 380/4 |
| 5,465,299 A | 11/1995 | Matsumoto et al. | 380/23 |
| 5,475,757 A | 12/1995 | Kelly | |
| 5,475,758 A | 12/1995 | Kikuchi | |
| 5,479,514 A | 12/1995 | Klonowski | |
| 5,485,577 A | 1/1996 | Eyer et al. | |
| 5,490,216 A | 2/1996 | Richardson | |
| 5,495,533 A | 2/1996 | Linehan et al. | 380/21 |
| 5,497,420 A | 3/1996 | Garneau et al. | |
| 5,497,479 A | 3/1996 | Hornbuckle | |
| 5,499,298 A | 3/1996 | Narasimhalu et al. | |
| 5,499,340 A | 3/1996 | Barritz | |
| 5,504,816 A | 4/1996 | Hamilton et al. | |
| 5,504,817 A | 4/1996 | Shamir | |
| 5,504,818 A | 4/1996 | Okano | |
| 5,504,933 A | 4/1996 | Saito | |
| 5,509,073 A * | 4/1996 | Monnin | 380/229 |
| 5,509,074 A | 4/1996 | Choudhury et al. | |
| 5,511,121 A | 4/1996 | Yacobi | |
| 5,515,441 A | 5/1996 | Faucher | |
| 5,515,538 A | 5/1996 | Kleiman | |
| 5,517,014 A | 5/1996 | Iijima | |
| 5,530,752 A | 6/1996 | Rubin | |
| 5,532,920 A | 7/1996 | Hartrick et al. | |
| 5,541,994 A | 7/1996 | Tomko et al. | |
| 5,553,143 A | 9/1996 | Ross et al. | |
| 5,553,145 A | 9/1996 | Micali | |
| 5,553,281 A | 9/1996 | Brown et al. | |
| 5,577,121 A | 11/1996 | Davis et al. | |
| 5,579,223 A | 11/1996 | Raman | |
| 5,581,682 A | 12/1996 | Anderson et al. | |
| 5,584,023 A | 12/1996 | Hsu | |
| 5,604,800 A | 2/1997 | Johnson et al. | |
| 5,606,609 A | 2/1997 | Houser et al. | |
| 5,606,613 A | 2/1997 | Lee | |
| 5,633,934 A | 5/1997 | Hember | |
| 5,636,277 A | 6/1997 | Nagahama | |
| 5,642,418 A | 6/1997 | Farris et al. | |
| 5,646,992 A | 7/1997 | Subler et al. | |
| 5,646,997 A | 7/1997 | Barton | |
| 5,646,999 A | 7/1997 | Saito | 380/25 |
| 5,649,099 A | 7/1997 | Theimer et al. | |
| 5,651,064 A | 7/1997 | Newell | |
| 5,666,411 A | 9/1997 | McCarty | |
| 5,680,452 A | 10/1997 | Shanton | |
| 5,689,587 A | 11/1997 | Bender | |
| 5,706,210 A | 1/1998 | Kumano et al. | |
| 5,715,393 A | 2/1998 | Naugle | |
| 5,740,246 A | 4/1998 | Saito | |
| 5,745,572 A | 4/1998 | Press | |
| 5,765,152 A | 6/1998 | Erickson et al. | |
| 5,765,176 A | 6/1998 | Bloomberg | |
| 5,771,383 A | 6/1998 | Magee et al. | |
| 5,794,115 A | 8/1998 | Saito | |

| | | | | | | |
|---|---|---|---|---|---|---|
| 5,812,762 | A | 9/1998 | Kim | EP | 0 518 365 A2 | 12/1992 |
| 5,818,933 | A | 10/1998 | Kambe et al. | EP | 0191162 B1 | 2/1993 |
| 5,825,892 | A | 10/1998 | Braudaway | EP | 0532381 | 3/1993 |
| 5,832,083 | A | 11/1998 | Iwayama et al. | EP | 0551016 | 7/1993 |
| 5,835,601 | A | 11/1998 | Shimbo et al. | EP | 0561685 | 9/1993 |
| 5,835,765 | A | 11/1998 | Matsumoto | EP | 0 581 227 | 2/1994 |
| 5,841,886 | A | 11/1998 | Rhoads | EP | 0 590 763 | 4/1994 |
| 5,848,155 | A | 12/1998 | Cox | EP | 0421808 B1 | 12/1994 |
| 5,848,158 | A | 12/1998 | Saito | EP | 0 649 074 | 4/1995 |
| 5,864,683 | A | 1/1999 | Boebert et al. | EP | 0665486 | 8/1995 |
| 5,867,579 | A | 2/1999 | Saito | EP | 0430734 B1 | 9/1995 |
| 5,889,868 | A | 3/1999 | Moskowitz | EP | 0354774 B1 | 4/1996 |
| 5,901,339 | A | 5/1999 | Saito | EP | 0715243 | 6/1996 |
| 5,910,987 | A | 6/1999 | Ginter et al. | EP | 0450841 B1 | 8/1996 |
| 5,912,969 | A | 6/1999 | Sasamoto et al. ............. 705/57 | EP | 0506435 B1 | 10/1996 |
| 5,933,497 | A | 8/1999 | Beetcher et al. | EP | 0489385 B1 | 3/1997 |
| 5,968,175 | A | 10/1999 | Mosishita et al. ........... 713/200 | EP | 0438154 B1 | 7/1997 |
| 5,974,141 | A | 10/1999 | Saito | EP | 0813133 A2 | 12/1997 |
| 5,982,891 | A | 11/1999 | Ginter et al. | EP | 0677949 B1 | 5/2003 |
| 5,986,690 | A | 11/1999 | Hendricks | EP | 0719045 B1 | 10/2003 |
| 6,002,772 | A | 12/1999 | Saito | EP | 0704785 B1 | 11/2003 |
| 6,006,328 | A | 12/1999 | Drake | EP | 0715241 B1 | 1/2004 |
| 6,026,430 | A | 2/2000 | Butman et al. | EP | 0746126 B1 | 12/2004 |
| 6,044,367 | A | 3/2000 | Wolff | EP | 0709760 B1 | 5/2006 |
| 6,069,952 | A | 5/2000 | Saito | GB | 2231244 | 11/1990 |
| 6,076,077 | A | 6/2000 | Saito | JP | 59169000 | 9/1984 |
| 6,081,794 | A | 6/2000 | Saito | JP | 60102038 | 6/1985 |
| 6,091,835 | A | 7/2000 | Smithies et al. | JP | 62-169540 | 7/1987 |
| 6,097,816 | A | 8/2000 | Saito | JP | 64-041387 | 2/1989 |
| 6,097,818 | A | 8/2000 | Saito | JP | 01048165 | 2/1989 |
| 6,128,605 | A | 10/2000 | Saito et al. | JP | 64-061782 | 8/1989 |
| 6,160,891 | A | 12/2000 | Al-Salqan | JP | 3128541 | 5/1991 |
| 6,182,218 | B1 | 1/2001 | Saito | JP | 3265241 | 11/1991 |
| 6,209,092 | B1 | 3/2001 | Linnartz | JP | 03-282989 | 12/1991 |
| 6,226,618 | B1 | 5/2001 | Downs et al. | JP | 4181282 | 6/1992 |
| 6,272,635 | B1 | 8/2001 | Saito | JP | 4268844 | 9/1992 |
| 6,408,390 | B1 | 6/2002 | Saito | JP | 5056037 | 3/1993 |
| 6,415,271 | B1 | 7/2002 | Turk et al. | JP | 5063142 | 3/1993 |
| 6,424,715 | B1 | 7/2002 | Saito | JP | 5075597 | 3/1993 |
| 6,438,694 | B2 | 8/2002 | Saito | JP | 05-122701 | 5/1993 |
| 6,449,717 | B1 | 9/2002 | Saito | JP | 5276476 | 10/1993 |
| 6,463,536 | B2 | 10/2002 | Saito | JP | 05-298373 | 11/1993 |
| 6,519,623 | B1 | 2/2003 | Mancisidor | JP | 5316102 | 11/1993 |
| 6,560,339 | B1 | 5/2003 | Iwamura | JP | 5324936 | 12/1993 |
| 6,574,609 | B1 | 6/2003 | Downs et al. | JP | 5327693 | 12/1993 |
| 6,603,864 | B1 | 8/2003 | Matsunoshita | JP | 5334324 | 12/1993 |
| 6,615,258 | B1 | 9/2003 | Barry et al. | JP | 6095591 | 4/1994 |
| 6,668,324 | B1 | 12/2003 | Mangold et al. | JP | 6131806 | 5/1994 |
| 6,721,887 | B2 | 4/2004 | Saito | JP | 6231536 | 8/1994 |
| 6,741,991 | B2 | 5/2004 | Saito | JP | 6236147 | 8/1994 |
| 6,744,894 | B1 | 6/2004 | Saito | JP | 6242304 | 9/1994 |
| 6,789,197 | B1 | 9/2004 | Saito | JP | 6264199 | 9/1994 |
| 6,851,053 | B1 | 2/2005 | Liles et al. | JP | 6264201 | 9/1994 |
| 6,874,089 | B2 | 3/2005 | Dick et al. | JP | 6269959 | 9/1994 |
| 7,024,681 | B1 * | 4/2006 | Fransman et al. ........... 725/115 | JP | 6290087 | 10/1994 |
| 7,036,019 | B1 | 4/2006 | Saito | JP | 6318036 | 11/1994 |
| 7,093,295 | B1 | 8/2006 | Saito | JP | 7014045 | 1/1995 |
| 2002/0021807 | A1 | 2/2002 | Saito | JP | 7271865 | 10/1995 |
| 2002/0052850 | A1 | 5/2002 | Saito | JP | 7302244 | 11/1995 |
| 2002/0122173 | A1 | 8/2002 | Saito | JP | 8185448 | 7/1996 |
| 2003/0144963 | A1 | 7/2003 | Saito | JP | 8292976 | 11/1996 |
| 2005/0262023 | A1 | 11/2005 | Saito | WO | WO8503830 | 8/1985 |

FOREIGN PATENT DOCUMENTS

| | | | | | |
|---|---|---|---|---|---|
| EP | 0121853 | 10/1984 | WO | WO8909528 | 10/1989 |
| EP | 0158167 | 10/1985 | WO | WO 9002382 | 3/1990 |
| EP | 0199410 | 10/1986 | WO | WO9307715 | 4/1993 |
| EP | 0341801 | 11/1989 | WO | WO 9520291 | 7/1995 |
| EP | 0391261 A3 | 3/1990 | WO | WO9613113 | 5/1996 |
| EP | 0 398 645 | 11/1990 | WO | WO9623257 | 8/1996 |
| EP | 0459046 | 12/1991 | WO | WO9627259 | 9/1996 |
| EP | 0542298 A3 | 11/1992 | | | |

| WO | WO9750036 | 12/1997 |

OTHER PUBLICATIONS

"Encryption of Information to be Recorded so as to Prevent Unauthorized Playback," 2244 Research Disclosure, Mar. 1992, No. 335, Emsworth, GB.
Gale, B. and Baylin, F., Scrambling and Descrambling, Satellite and Cable TV 2nd Ed, Baylin/Gale Productions 1986 Boulder CO; pp. 163-165.
U.S. Appl. No. 11/556,992, filed Nov. 6, 2006, Saito.
U.S. Appl. No. 11/469,035, filed Aug. 31, 2006, Saito.
U.S. Appl. No. 11/512,885, filed Aug. 29, 2006, Saito.
U.S. Appl. No. 11/512,695, filed Aug. 29, 2006, Saito.
U.S. Appl. No. 11/496,777, filed Jul. 31, 2006, Saito.
U.S. Appl. No. 11/491,400, filed Jul. 20, 2006, Saito.
U.S. Appl. No. 11/480,690, filed Jul. 3, 2006, Saito.
U.S. Appl. No. 11/446,604, filed Jun. 1, 2006, Saito.
U.S. Appl. No. 11/441,973, filed May 25, 2006, Saito.
U.S. Appl. No. 11/404,124, filed Apr. 12, 2006, Saito.
U.S. Appl. No. 11/190,177, filed Jul. 25, 2005, Saito.
Memon, Nasir, et al., "Protecting Digital Media Content" Association for Computing Machinery, Communications of the ACM, New York, Jul. 1998, vol. 41, issue 7, pp. 35-43.
Murphy, Kathleen, "Digimarc Awarded Patent for Digital Watermarking" Business, Mar. 10, 1998, www.internetnews.com/bus-news/article.php/19611, 2 pgs.
Hedberg, S.R. "HP's International Cryptography Framework: Compromise or Threat?" IEEE Computer, Jan. 1997, pp. 28-30.
Anonymous, "Security" Government Executive, National Journal, Inc. Washington, vol. 29, issue 1, Jan. 1997, pp. 35-37.
Wayner, P. "Digital Copyright Protection" AP Professional, 1997, pp. 1-7 and 14-17.
U.S. Appl. No. 10/170,677, filed Jun. 13, 2002, Saito.
U.S. Appl. No. 10/013,507, filed Dec. 13, 2001, Saito.
Menezes, Alfred, et al., "Handbook of Applied Cryptography" 1997, sec. 11.5.1, CRC Press, pp. 452-454.
Fitch, K. "User Authentication and Software Distribution on the Web", ausweb97@scu.edu.au Nov. 5, 1996, pp. 1-12.
Rubin, A.D., "Trusted Distribution of Software Over the Internet" Network and Distributed System Security, Feb. 16-17, 1995, San Diego, California, pp. 47-53.
U.S. Appl. No. 09/665,902, filed Sep. 20, 2000, Saito.
Bryan, John "A look at five different firewall products and services you can install today" www.byte.com/art/9504/sec10/art6.htm, Apr. 1995.
Rubin, A.D., "Secure Distribution of Electronic Documents in an Hostile Environment" Computer Communications, vol. 18, No. 6, Jun. 1995, pp. 429-434.
Bellovin, S.M. et al., "Network Firewalls" IEEE Communications Magazine, vol. 32, No. 9, Oct. 1994, pp. 50-57.
U.S. Appl. No. 09/476,334, filed Jan. 30, 2000, Saito.
U.S. Appl. No. 09/362,955, filed Jul. 30, 1999, Saito.
Rozenblit, M. "Secure Software Distribution" IEEE Network Operations and Management Symposium, vol. 2, Feb. 14-18, 1994, pp. 486-496.
Van Schyndel, R.G., et al., "A Digital Watermark" IEEE, Australia, 1994, pp. 86-90.
Medvinsky, Gennady et al., "NetCash: A design for practical electronic currency on the Internet" University of Southern California Information Science Institute, Nov. 1993, pp. 2-7.
Lennil, P. "The IBM Microkernel Technology," OS/2 Developer, vol. 5, Nov. 1, 1993 (pp. 70-72, 74) XP000672962.
Seki, Kazunori et al., "A Proposal of a New Distribution Scheme for Software Products", Keio Department of Instrumentation Engineering, Faculty of Science and Technology, Keio University, Research report made at the information Processing Association, Japan, Jul. 20, 1993, vol. 93, No. 64, pp. 19-28.
Vigarie, J. "A Device for Real-Time Modification of . . ." 18$^{th}$ International Television Symposium and Technical Exhibition, Montreaux, Switzerland, Jun. 10-15, 1993, pp. 761-768.

Neuman, Clifford B., Proxy-Based Authorization and Accounting for Distributed Systems, Proceedings of the 13$^{th}$ International Conference on Distributed Computing Systems, May 1993, pp. 283-291.
Harn, Lein, et al., "Software Authentication System for Information Integrity" Computers & Security International Journal Devoted to the Study of Technical and Financial Aspects of Computer Security, vol. II, Dec. 1, 1992, pp. 747-752, XP000332279.
U.S. Appl. No. 08/895,493, filed Jul. 16, 1997, Saito.
U.S. Appl. No. 08/846,661, filed May 1, 1997, Saito.
Masuoka, Fujio, Progressing Flash Memories Kogyo Chosa-kai Co., Chapter 1: Semiconductor Memory, pp. 34-68.
Tatsuaki Okamoto, "Universal Electronic Cash", Technical Report of Institute of Electronics, Information and Communication Engineers (IEICE) Jul. 15, 1991, vol. 91, No. 127, pp. 39-47.
Komatsu, Naohisa, et al., "A Proposal on Digital Watermark in Document Image Communication and its Application to Realizing a Signature" Electronics & Communications in Japan Part I—Communications, vol. 73, No. 5, part I, May 1, 1990, pp. 22-33.
U.S. Appl. No. 08/733,504, filed Oct. 18, 1996, Saito.
Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.
Morizaki, H., "Introduction to Electronic Devices" Gijustsu Hyoron Publishing Co., 1989, pp. 260-266.
Grampp, F.T. et al., "Unix Operating System Security" AT&T Bell Laboratories Technical Journal, vol. 63, No. 8, Oct. 1984, New York, pp. 1649-1672.
Adachi, R., "Introduction to handcraft of Personal Computer" Natsume Publishing Co., 1983, pp. 141-155.
U.S. Appl. No. 11/701,943, filed Feb. 1, 2007.
U.S. Appl. No. 11/701,945, filed Feb. 1, 2007.
U.S. Appl. No. 11/701,946, filed Feb. 1, 2007.
Search Report dated Oct. 24, 2002.
Ohtaki, Yasuhiro et al., "Cryptographic Management for Superdistribution" Technical Research Report of Electronic Information Communication Association, Mar. 8, 1991, vol. 90, No. 460, pp. 33-42.
Kent, Stephen T., "Internet Privacy Enhanced Mail," Association for Computing Machinery, Communications of the ACM, Aug. 1993, vol. 36, issue 9, pp. 48-61.
Tirkel, A.Z. et al., "Electronic Water Mark," Conference Proceedings Dicta, Dec. 1993, pp. 666-673.
Response to Notice of Non-Compliant Amendment; U.S. Appl. No. 10/352,078, filed May 13, 2008.
Restriction Requirement; U.S. Appl. No. 10/352,078; Mailed Mar. 21, 2008.
Non-Final Office Action; U.S. Appl. No. 10/105,262; Mailed Jan. 31, 2008.
Response to Office Action; U.S. Appl. No. 10/105,262, filed Apr. 30, 2008.
Response to Restriction Mailed Mar. 21, 2008; U.S. Appl. No. 10/352,078, filed Apr. 21, 2008.
Non-Final Office Action; U.S. Appl. No. 11/469,035; Mailed Jun. 11, 2008.
Response to Office Action Mailed Aug. 23, 2007; U.S. Appl. No. 11/469,035, filed Feb. 22, 2008.
Response to Office Action Mailed Oct. 18, 2007; U.S. Appl. No. 11/556,992, filed Mar. 18, 2008.
Final Office Action; U.S. Appl. No. 11/556,992; Mailed Jun. 25, 2008.
Response to Official Action issued in U.S. Appl. No. 11/469,035 dated Jun. 11, 2008, 18 pages filed Sep. 11, 2008.
Official Action issued in U.S. Appl. No. 11/469,035 dated Dec. 12, 2008, 7 pages.
Response to Official Action issued in U.S. Appl. No. 11/469,035 dated Dec. 12, 2008, 19 pages filed Feb. 12, 2009.
Response to Official Action issued in U.S. Appl. No. 11/556,992 dated Jun. 25, 2008, 12 pages filed Aug. 25, 2008.
Official Action issued in U.S. Appl. No. 11/556,992 dated Sep. 15, 2008, 8 pages.
Response to Official Action issued in U.S. Appl. No. 11/556,992 dated Sep. 15, 2008, 13 pages filed Dec. 15, 2008.

Official Action issued in U.S. Appl. No. 10/352,078 dated Aug. 7, 2008, 18 pages.
Amendment filed in U.S. Appl. No. 10/352,078 on Oct. 7, 2008, 22 pages.
Amendment filed in U.S. Appl. No. 10/352,078 on Feb. 7, 2009, 18 pages.
Intention to Grant issued in European Application No. 06014712.1 on December 17, 2008, 38 pages.

Official Action in Japanese Patent Application No. 2007-260256 dated Sep. 7, 2009, 8 pages; English Translation Available.
Office Action of Jul. 23, 2009 in U.S. Appl. No. 11/469,035.
Office Action of Mar. 19, 2009 in U.S. Appl. No. 11/556,992.
Response to Office Action of Mar. 19, 2009 in U.S. Appl. No. 11/556,992.

* cited by examiner

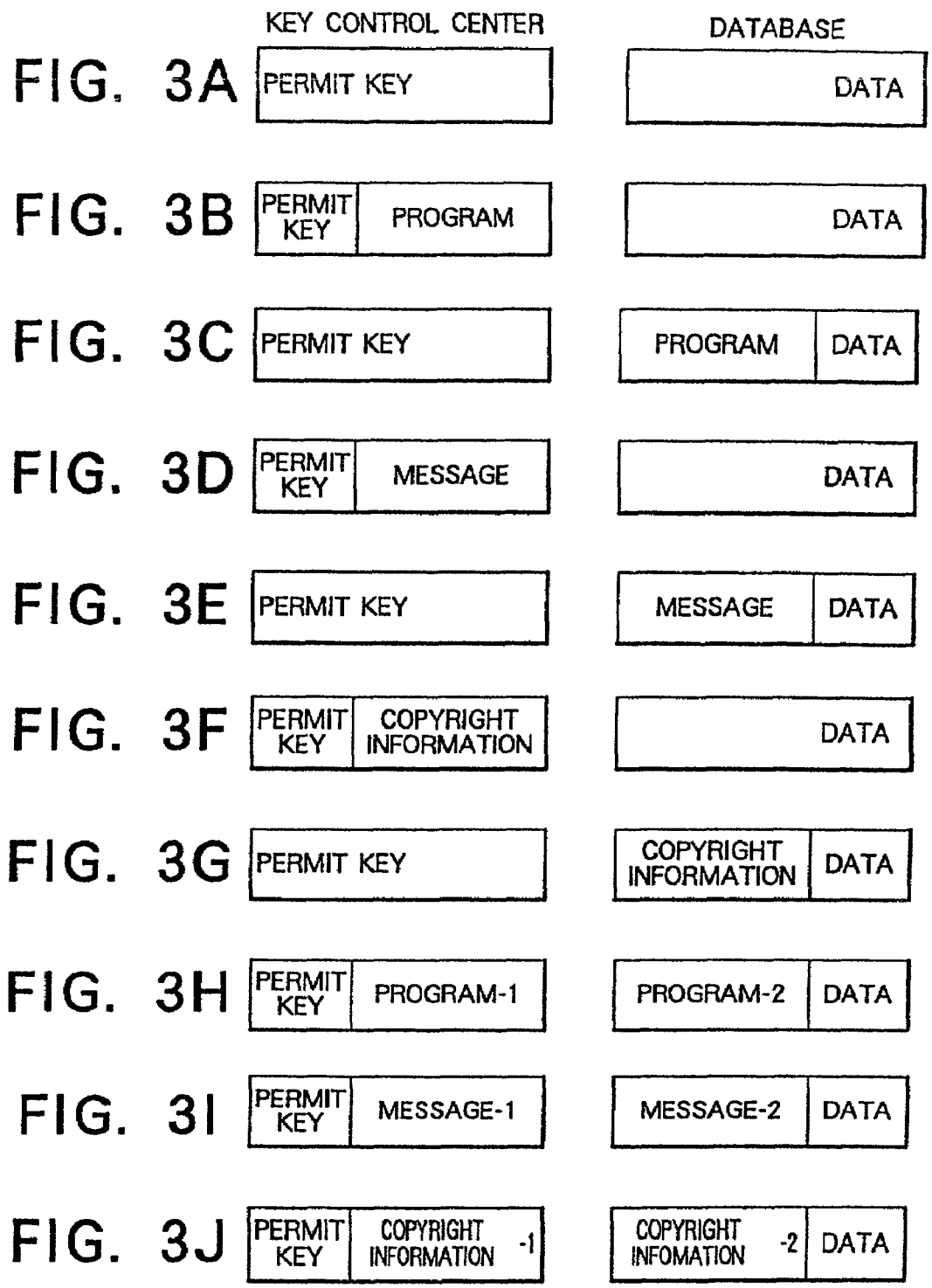

METHOD FOR CONTROLLING DATABASE COPYRIGHTS

BACKGROUND OF THE INVENTION

1. Field of the Invention

The present invention relates to a method for controlling copyrights on utilizing, storing, copying, editing and transferring of digital data, and in particular, to an application of the method to a multimedia system.

2. Background Art

In the information oriented society of today, database systems are becoming wide spread in which it is possible to use various types of data, stored independently by each computer in the past, by connecting computers via communication lines.

In such a database system, the information handled up to this point has been conventionally coded information that can be processed by computer, and that contains a relatively small amount of information and monochrome binary data, such as facsimile information at the most. It is not possible to handle data containing a relatively large amount of information, such as data for natural pictures or animation.

With the rapid progress of digital processing techniques for various types of electrical signals, a technique is under development for digital processing of picture signals other than binary data, handled only as analog signals in the past.

By digitizing the picture signal, it is possible to handle a picture signal, such as television signal, by computer. As a technique of the future, attention is now focused on "multimedia systems", which can simultaneously handle the data processed by computers and digitized picture data. Because the picture data contains an overwhelmingly large amount of information compared with character data and audio data, it is difficult to store, transfer or process the picture data by computer. For this reason, techniques for compressing and expanding picture data have been developed. Further, several standards for compression/expansion of picture data have been established. For example, the following standards have been established as common standards: JPEG point Photographic image coding Experts Group) standards for still pictures, H.261 standards for television conferences, MPEG1 (Moving Picture image coding Experts Group 1) standards for picture accumulation, and MPEG2 standards to cope with current television broadcasting and high definition television broadcasting. By implementing these new techniques, it is now possible to transmit digital picture data in real time.

For analog data, which has been widely used in the past, the control of copyrights during processing has not been an important issue because the quality of the analog data deteriorates each time the data is stored, copied, edited or transferred. However, the quality of digital data does not deteriorate even when the data is repeatedly stored, copied, edited or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound and picture recording devices has been prescribed.

It is possible not only to refer to the content of a database, but also to effectively utilize the data obtained from the database by storing, copying or editing the data, and also transferring the edited data to other persons or to the database with the edited data registered as new data.

In a conventional database system, only character data is handled. However, in multimedia systems, sound data and picture data, which are originally analog data, are digitized and used as part of the database in addition to the other data in the database, such as character data.

Under such circumstances, it is an important question as to how to handle copyrights of the data in the database. However, there are no means in the prior art for copyright management and control of such actions as copying, editing, transferring, etc., of data.

A system for executing copyright control by using encrypted data and obtaining a permit key from a key control center via public telephone lines is disclosed in Japanese Patent Application 4-199942 (U.S. Ser. No. 08/098,415) and Japanese Patent Application 4-289074 (U.S. Ser. No. 08/143,912) of the present inventors. A device for this purpose is disclosed in Japanese Patent Application 4-276941 (U.S. Ser. No. 08/135,634), also of the present inventors.

SUMMARY OF THE INVENTION

It is an object of the present invention to provide a method for controlling copyrights in the display (including the process of providing sound), storage, copying, editing and transfer of digital data in a database system including real time transmission of digital pictures.

For the control of copyrights in the database system to which the present invention is applied, it is essential to transmit one or more of copyright information; i.e., messages of copyright control, information about copyrights and a program for controlling copyrights, when necessary, in addition to a key for enabling users who wish to use encrypted data.

The copyright control message is displayed on a screen and advises or warns the user if the data is being utilized in a manner inconsistent with the conditions of the user's request or permission. The copyright control program watches and controls data use so that the data is not utilized beyond the conditions of the user's request or permission.

The copyright control program, the copyright information and the copyright control message are supplied together with a permit key in some cases, but they may also be supplied together with data in other cases. It is also possible to supply a part of them together with the permit key, and to supply the other part with the data.

For the data, the permit key, the copyright control message, the copyright information and the copyright control program, there are the following three cases: they are transmitted in encrypted form and decrypted upon use; they are transmitted in encrypted form and decrypted only when they are displayed; or they are not encrypted at all.

BRIEF DESCRIPTION OF THE DRAWINGS

FIG. 3A to FIG. 3J illustrate embodiments of the present invention.

DETAILED DESCRIPTION

In the following, description will be given on embodiments of the present invention.

In the prior patent applications mentioned above, it is assumed that a permit key obtaining route is different from a data obtaining route as shown in FIG. 3A, and that the permit key is obtained from a key control center via public telephone lines. However, if a charging method is determined, it is possible to obtain the permit key via the communication system through which the database is supplied.

In the system of the prior patent applications, it is assumed that the permit key for secondary exploitation is used for distribution of the data selected for secondary exploitation. Secondary exploitation involving the storing, copying, editing, transferring, etc. of data is not included in the assumption. Also, it is assumed that the data is distributed only inside a LAN to which the users belong. Distribution outside the LAN is not part of the assumption. Therefore, the system is not adequate to cope with secondary exploitation unless the users choose to honor the copyright.

Figure 4A:
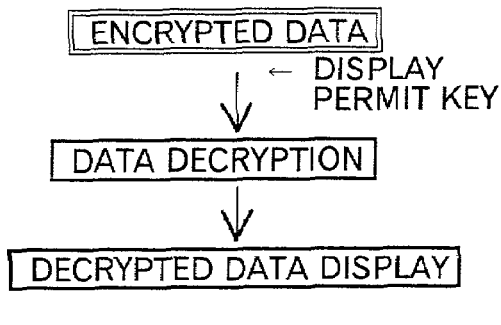
FIGS. 4A-4E illustrate structures of embodiments of the present invention.
Figure 4B:
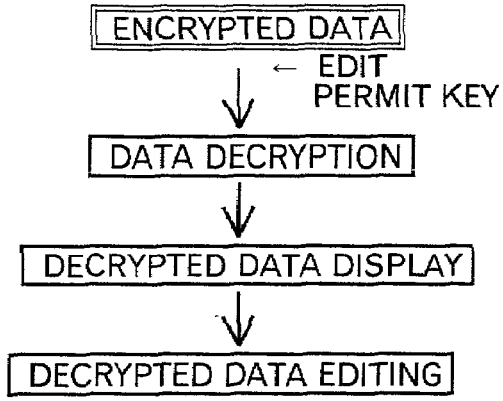
Figure 4C:
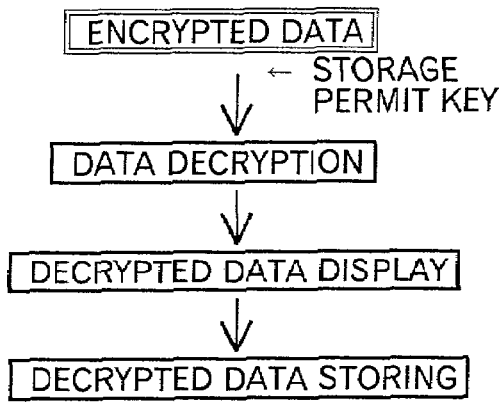
Figure 4D:
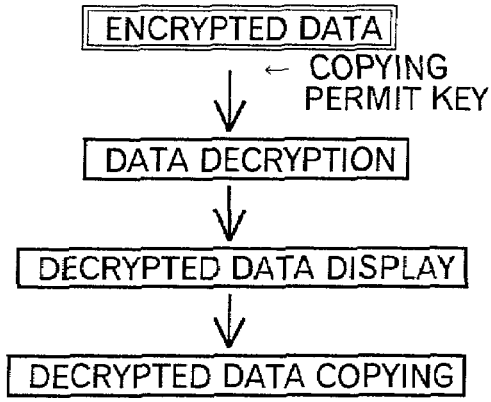
Figure 4E:
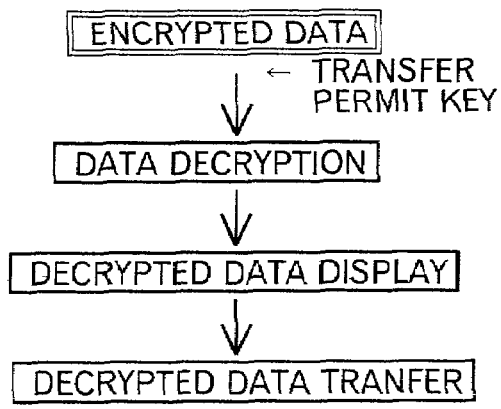

To cope with various forms of the secondary exploitation as described above, a plurality of permit keys are prepared to match each form of use, and no utilization is possible unless there is a permit key suitable for the desired form of use. As to the forms of use available for a database, there are display, storage, copying, edit, transfer, etc. Examples of these utilization forms as shown in FIGS. 4A to 4E. FIG. 4A illustrates a case when supplied encrypted data is displayed. The encrypted data is decrypted by a display permit key, and the data thus decrypted is displayed. FIG. 4B illustrates a case when supplied encrypted data is edited. The encrypted data is decrypted by an edit permit key, and the data thus decrypted is displayed, and then editing is performed. FIG. 4C illustrates a case when supplied encrypted data is stored. The encrypted data is decrypted by a storage permit key, and the data thus decrypted is displayed, and then storing is performed. FIG. 4D illustrates a case when supplied encrypted data is copied. The encrypted data is decrypted by a copy permit key, and the data thus decrypted is displayed, and then copying is performed. FIG. 4E illustrates a case when supplied encrypted data is transferred. The encrypted data is decrypted by a transfer permit key, and the data thus decrypted is displayed, and then transfer is performed. In these Figures, double-framed parts show that data is encrypted. The permit keys suitable for these forms of use should be prepared. However, in the case where the ability to execute several forms of use at the same time is desired, it is necessary to obtain a plurality of permit keys. If the user fails to obtain the permit keys, the desired form of use may not be executed.

To avoid such situations, a permit key can be used which makes it possible to execute several forms of use. Hierarchical permit keys can be used such that an upper level key also fulfills the function of a lower level key. For example, from lower level to upper level, the hierarchy is defined as: display<storage<copying<edit<transfer. With the display permit key, only display operations can be executed. Display and storage operations can be executed by the storage permit key. Display, storage and copying operations can be executed by the copying permit key. Display, storage, copying and edit operations can be executed by the edit permit key. Display, storage, copying, edit and transfer operations can be executed by the transfer permit key.

In the prior patent application, i.e., Japanese Patent Application 4-276941 (U.S. Ser. No. 08/135,634), the present inventors have proposed a system in which a plurality of encrypted data, each encrypted by one of a plurality of different crypt keys, are recorded (stored) in encrypted form. The data is decrypted when it is utilized in the system where the storage permit key is the lowest level key.

By applying this system, it is possible to order key hierarchy from lower-level to upper-level in the order of: storage<copying<transfer<display<edit. Specifically, the order is set in such manner that storage operations can be executed by a storage permit key; storage and copying operations can be executed by a copying permit key; storage, copying and transfer operations can be executed by a transfer permit key; storage, copying, transfer and display operations can be executed by a display permit key; and storage, copying, transfer, display and edit operations can be executed by an edit permit key.

In this system, storage, copying and transfer are placed at a lower level than display because, even when storage, copying and transfer operations are executed on the data, it is difficult and meaningless to utilize the data since it cannot be displayed. It is necessary to execute display in order to utilize the data. This hierarchical arrangement is best suited to a system, in which encrypted data are supplied and are utilized using a permit key.

The permit key is usually offered to the user on payment basis. Therefore, except where data utilization is unlimited, the number of times the permit key may be used is limited to one time or several times if it is necessary to limit the number of times the data is used.

Because the data can be used if there is a permit key, it is possible to use the data beyond the permitted range if the permit key is duplicated or falsified. To prevent this, the permit key is encrypted.

The use of data includes storage, display, copying, edit, transfer, etc. thereof, which are necessary to be allowed or prohibited.

In the case where it is necessary to limit the number of usage times or to limit forms of use, it is desirable to display a message for such purpose.

In the case where the information under copyright is falsified, the data supplier or the user may suffer damages. This must be prevented.

To ensure complete copyright control, information on the original copyright and information on secondary and tertiary copyrights for the edition of the data are given to the data.

The above copyright control is executed by, the copyright control program.

In a conventional database system, the data itself is offered in a completely defenseless state. Therefore, copyright control can be executed only when data is taken out of the database. In the subsequent copyright control, there is no other way but to rely on conscience of the user and to take necessary measures when the data is utilized beyond the permitted range of use.

For this reason, as described in the prior patent application, i.e., Japanese Patent Application 4-276941 (U.S. Ser. No. 08/135,634), the data supplied from the database are left in an encrypted state, and storage is executed under this condition. In addition, copying and transfer are also executed in the encrypted state. Decrypting is performed only in display and edit operations, and these are controlled by the copyright control program. These examples are shown in FIGS. 5A to 5E.

Figure 5A:
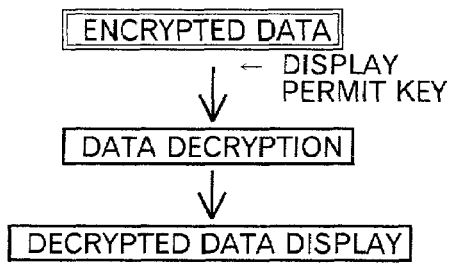
FIGS. 5A-5E illustrate structures of embodiments of the present invention.
Figure 5B:
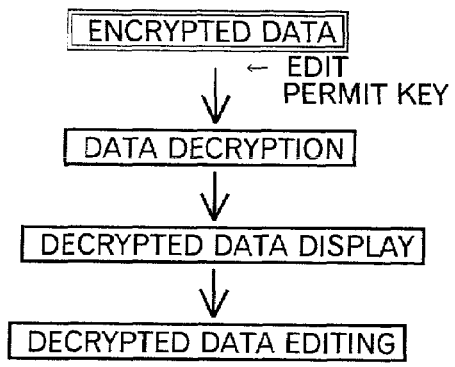
Figure 5C:
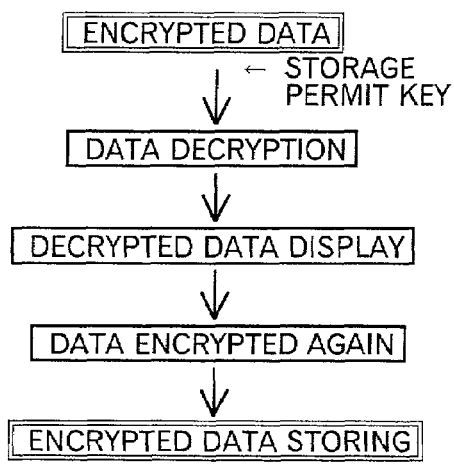
Figure 5D:
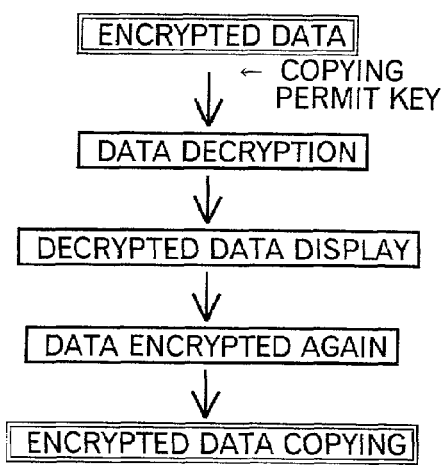
Figure 5E:
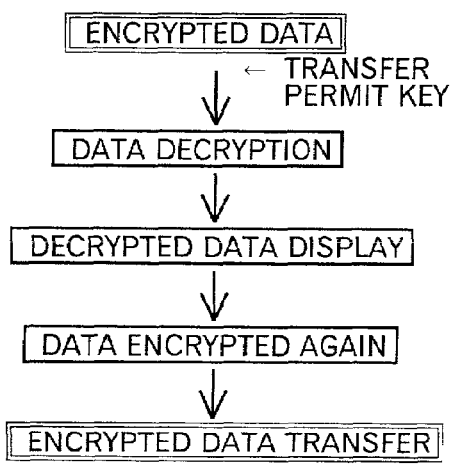

FIG. 5A illustrates a case when supplied encrypted data is displayed. The encrypted data is decrypted by a display permit key, and the data thus decrypted is displayed. FIG. 5B illustrates a case when supplied encrypted data is edited. The encrypted data is decrypted by an edit permit key, and the data thus decrypted is displayed, and then editing is performed. FIG. 5C illustrates a case when supplied encrypted data is stored. The encrypted data is decrypted by a storage permit key, and the data thus decrypted is displayed, and then, the decrypted data is encrypted again by the storing permit key, and then storing is performed. Thus, the data encrypted again is stored. FIG. 5D illustrates a case when supplied encrypted data is copied. The encrypted data is decrypted by a copy permit key, and the data thus decrypted is displayed and then, the decrypted data is encrypted again by the copy permit key, and then copying is performed. Thus, the data encrypted again is copied. FIG. 5E illustrates a case when supplied encrypted data is transferred. The encrypted data is decrypted by a transfer permit key, and the data thus decrypted is displayed and then, the decrypted data is encrypted again by the transfer permit key, and then transfer is performed. Thus, the data encrypted again is transferred. In these Figures, double-framed parts show that data is with encrypted. In so doing, it is impossible to use the data beyond the permitted range. In this case, the copyright control program may be integrated with the data or may be encrypted.

Because the copyright control program is encrypted and the permit key decrypts the copyright control program, and because the copyright control program decrypts and encrypts the data, the data is encrypted twice.

In this case, if a crypt key unique to the data is added to the copyright control program for the purpose of encrypting the data, it is impossible to decrypt the data if the copyright control program is separated from the data.

In this copyright control program, even if the data is stored, copied or transferred within the permitted range of use, and if these operations are executed after the data and the copyright control program have been encrypted, it is impossible to use the date in an undesired manner.

If an operator uses a computer program inadequately and, as a result, the computer does not respond any more or computer operation is stopped, an error message is displayed so that the operator may know the cause. Similarly, if a user of the database erroneously uses the data beyond the permitted range of the permit key, and, as a result, the computer does not respond or operation is stopped, the user cannot understand the cause. In this case, a copyright control message is displayed just as an error message is displayed by the copyright control program.

The display of the copyright control message as described above also fulfills the function of providing a warning if the user intentionally uses the data beyond the range of use permitted by the permit key.

In general, various programs are incorporated into read-only memory (ROM) inside the equipment which the user uses, or the programs are supplied from software. When the programs are incorporated into ROM, there is no possibility that the programs may be changed. However, the equipment to be used is limited to systems that contain the ROM. On the other hand, when the programs are supplied from software, there is no system limitation if the programs are transferred. However, there is a possibility that the programs may be altered.

The database is utilized by various users using various types of devices. Therefore, if the programs for controlling copyrights are supplied as software, it is necessary to cope with various types of devices. Further, alteration of the programs must not be possible. Therefore, the copyright control program should be encrypted to prevent such trouble. In this case, it is necessary to modify the program according to the device that the user uses. A program to translate the copyright control program is provided in the communication software of the device which the user uses. The copyright control program can then be translated by the translation program so that it suits the device.

Even though the permit key for using the database may become more complicated due to encryption, a data size of several tens of bites is sufficient. Therefore, the time required for transmitting the permit key is far shorter than one second. In other words, even when a payment-based public telephone line is used and other information is transmitted together with the permit key, the increase of cost is negligible.

Therefore, when transmitting the permit key as shown in FIG. 3B, utilizing surplus time, the copyright control program can be transmitted.

The copyright control program can be supplied together with the permit key and also together with the data as shown in FIG. 3C.

In this case, the copyright control program is supplied together with the data, and the entire data utilization process is placed under control of the copyright control program. For example, the data supplied in encrypted form cannot be decrypted unless the copyright program supplied with it is used. If there is no such copyright control program, the data cannot be used. Thus, the control of copyrights is reinforced. Also, integration of the copyright control program with the data further reinforces copyright control.

The following are some examples of the copyright control message:
"Need a display permit key."
"Need a storage permit key."
"Need a copying permit key."
"Need an edit permit key."
"Need a transfer permit key."
Some other examples are:
"Display unavailable."
"Storage unavailable."
"Copy unavailable."
"Edit unavailable."
"Transfer unavailable."

Figure 1A:
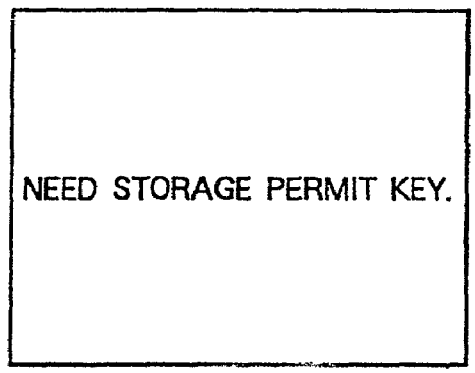
FIG. 1A and FIG. 1B illustrate examples of display messages of the present invention.
Figure 1B:
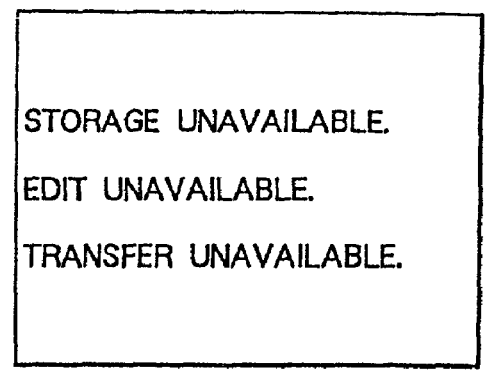

These copyright control messages are displayed alone as shown in FIG. 1A or in combination as shown in FIG. 1B.

Next, description will be given on supply of the copyright control message.

To display the copyright control message, the message must be stored in the memory of the device which the user uses. The memory in the device is classified as ROM and random-access memory (RAM).

The method of storing the messages in ROM is reliable, but there is a limitation to the device because the user must use the ROM wherein the copyright control messages are stored.

As for methods for storing messages in RAM, there is a method for supplying messages together with the permit key, a method for supplying messages together with the copyright control program, and a method for supplying messages together with the data. When the permit key and the copyright control program are supplied at the same time, the copyright control message can also be supplied at the same time.

The copyright control message is not effective unless an adequate message is displayed. For this reason, the copyright control message cannot play its designed role if the message is changed in such a manner that no substantial content is displayed, or further, if its content is deleted such that nothing is displayed. To prevent this trouble, the message is encrypted.

The display of the copyright control message is executed by the copyright control program. The modes of display are as follows. (1) When an operation is attempted with no adequate key available, a corresponding message is displayed. (2) All messages corresponding to operations available for the current permit key are displayed, if an operation is attempted without an available permit key.

The copyright control message is supplied together with the permit key as shown in FIG. 3D, or together with the data as shown in FIG. 3E.

The copyright control message is transmitted by transmitting all messages or only the necessary messages required. In the former case, the quantity of information is relatively large, but security is high. In the latter case, the quantity of information is relatively small, but security is low.

It is desirable that the copyright control message be inseparable from the data, as in the case of the copyright control program. This may be facilitated by integrating the copyright control message with the copyright control program.

To display the copyright on printed matter, the name of the author and the date are used. The copyright of the database is displayed by entering information such as the name of the author and the date.

As described above, edit and up-load of edited data are included in the use of the data in the database. Specifically, the presence of secondary data, which is edited from the data, i.e. a work of authorship, is recognized. To ensure the copyright of the data in this context, it is necessary to store the information on original authorship and secondary authorship together with the data. In case the data is used in a manner other than for down-loading and display, copyright information including information on the operator, in addition to the copyright information stored up to that moment, is stored together with the data as history.

In this case, only the person who controls the database can put the original authorship into the database as primary data. All data handled by other than the person in charge of database control is considered secondary data. Control of the data history is therefore further reinforced.

When the copyright information is separated from data which is a work of authorship, it becomes extremely difficult to recognize the copyright. Thus, it is necessary that the copyright information be inseparable from the data.

To prevent separation of the copyright information from the data, a method for integrating the data with the copyright information or a method for making the data unusable without copyright information are described. These methods are similar to the methods described above for the copyright control program and the copyright control message.

First, description will be given for a method for integrating the data with the copyright information.

The data handled by computer comprises a file header indicating data name and size, and a file body, which comprises the main body of data. Therefore, for integrating the data with the copyright information, there are methods that integrate the copyright information with the file header, that integrate the copyright information with the file body, and that take other means for the purpose.

Among these methods, for the method that integrates the copyright information with file header, if the data is character information expressed with character code, it is available even without a file header. Thus, the method is simple, but not very reliable. Also, because the capacity of the file header is not high, it is not sufficient if there is a large amount of copyright information.

Digital picture data and digital sound data are grouped together under a common group header. The copyright information can be integrated into this group header. However, there is a problem of header capacity similar to the case for the file header.

For the method of integrating the copyright information with the file body, one way is to add copyright information for each piece of data edited. Another way is to add the copyright information all together.

To add the copyright information for each piece of data edited, the copyright information is added to each piece of data which is edited by a cut-and-paste procedure and produced. This is not only complicated but disadvantageous in that the entire file data becomes too big.

If the picture data indicates the copyright of original authorship, it is easy to identify corresponding data. Thus, it is not always necessary to add the copyright information to each minimum unit of the edited data.

It is also possible to write the copyright information into the copyright control program. In this method, it is difficult to manipulate the copyright information if it is written into the copyright control program integrated with the data as already described.

If the data is a picture signal, it is necessary to have synchronization signal data in order to define scanning line, field and frame. This synchronization signal has high redundancy and is generally represented with variable-length code. Thus, the copyright information can be mixed with the variable-length code. The number of scanning lines is 480 for VGA standards. By utilizing this method, a considerable quantity of information can be mixed into it.

In case the picture data is an animated picture, it is possible to write a sufficient quantity of copyright information in this method. However, if the picture data is still picture edited by a cut-and-paste procedure, there may not be enough space to add the copyright information.

Figure 2A:
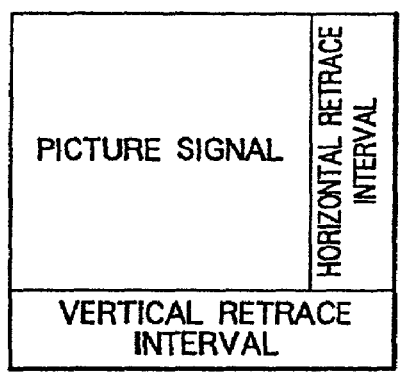
FIG. 2A and FIG. 2B illustrate structures for television signals.
Figure 2B:
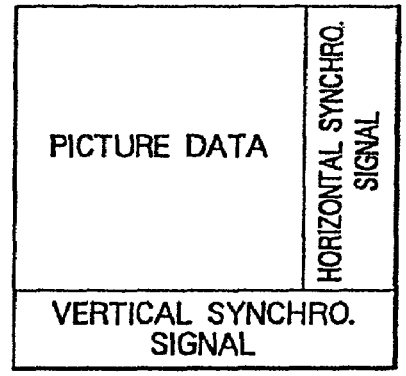

FIG. 2A and FIG. 2B represent structures for an analog television signal and a digital television signal. FIG. 2A represents an analog television signal, and FIG. 2B shows a digital television signal.

A signal containing other than picture data, such as the multiplex teletext signal in analog television, is inserted by utilizing the vertical retrace interval. The horizontal retrace interval is not utilized.

In contrast, in digital television, it is possible for a copyright control program or other multiplex teletext signal to be placed into horizontal scanning data or into vertical scanning data.

As a method for integrating the copyright information with data, one way is to write the copyright information into the data itself, and another is to write it into control code.

With the data used in computer, there is control code for controlling the communication system or computer system in addition to the data to be displayed on screen or used for some operation. This control code cannot be seen by the user. Therefore, if the copyright information is written into the control code, the copyright information thus written does not cause trouble for the user.

It is also possible to enter the copyright information into files of the computer using the technique of a computer virus without affecting the operation itself.

The copyright information may be supplied together with the permit key as shown in FIG. 3F or may be supplied together with data as shown in FIG. 3G.

Attention has been focused in recent years on digital signatures. Using a private key, which only the person concerned knows, and a public key, which other persons also know, a digital signature is prepared from the private key and from the data on the file size of the document data. If the document data is changed, the change can be confirmed by the private key, and the content of the document data can be seen at any time by other persons using the public key. Thus, this scheme offers very high security.

The data in a computer can be changed without leaving any trace. Because of this, an author may not notice that his copyright is infringed, or a user may use the data without knowing that the content of the data has been changed, and the author or user may suffer damages. To prevent this, a digital signature is attached to the data, and damage to the copyright owner or the user can be avoided.

The permit key, copyright control program, copyright control message, and copyright information can be combined in any way as necessary to actualize the method for controlling database copyrights.

Also, it is possible to design in such a manner that only a part of the data of the copyright control program, the copyright control message or the copyright information is supplied together with the permit key as shown in FIGS. 3H, 3I and 3J, and that the other part is supplied together with the data to be utilized. The part supplied with the permit key and the part supplied together with the data are then combined, and the functions of the complete permit key may be served after they have been combined together.

Thus, it is possible to give the function of the permit key to the copyright program and copyright control message, and higher security is ensured.

I claim:

1. A method comprising:
receiving at a user device over a computer network a first utilization permit key specifically associated with a first set of data, wherein the first utilization permit key is configured to permit the user device to perform, with the first set of data, a first of a plurality of data use types, wherein the plurality of data use types are arranged in a hierarchy such that the first utilization permit key is also configured to permit the user device to perform, with the first set of data, any use types that are lower in the hierarchy than the first data use type; and
receiving at the user device a second utilization permit key specifically associated with a second set of data distinct from the first set of data, wherein the second utilization permit key is configured to permit the user device to perform, with the second set of data, a second of the plurality of data use types, wherein the second utilization permit key is also configured to permit the user device to perform, with the second set of data, any use types that are lower in the hierarchy than the second data use type, wherein the second data use type is different from the first data use type;
the user device performing, with the first and second sets of data, only the respective data use types that are permitted by the received first and second utilization permit keys;
wherein the plurality of data use types includes at least one of the following use types: displaying, editing, storing, copying, transferring.

2. The method of claim 1, wherein a copyright control program on the user device ensures said performing is only of the respective data use types;
wherein the method flirt her comprises the copyright control program decrypting the first set of data using the first utilization permit key.

3. The method of claim 1, further comprising displaying a copyright control message when the user device attempts a use type of the first set of data that is different from the use types that are permitted by the received first utilization permit key.

4. The method of claim 1, further comprising limiting, by a copyright control program, a number of times the first set of data is used by the user device.

5. The method of claim 1, further comprising limiting, by a copyright control program, a number of times the received first utilization permit key is used by the user device.

6. The method of claim 1, further comprising maintaining, by a copyright control program, copyright information on the first set of data.

7. The method of claim 6, wherein the copyright information includes history information on authorship of the first set of data.

8. The method of claim 2, further comprising receiving the copyright control program at the user device with the first utilization permit key.

9. The method of claim 2, further comprising receiving the copyright control program at the user device with the first set of data.

10. The method of claim 1, wherein the first utilization permit key is received at the user device from a key control center.

11. The method of claim 10, further comprising receiving the copyright control program from the key control center at the user device with the first utilization permit key.

12. A method comprising:
receiving at a user device a first utilization permit key associated with a first set of data, wherein the first utilization permit key is usable to perform cryptographic operations on the first set of data and is configured to permit one or more additional use types on the first set of data;
receiving at the user device a second utilization permit key associated with a second set of data, wherein the second utilization permit key is usable to perform cryptographic operations on the second set of data and is configured to permit one or more additional use types on the second set of data; and
the user device decrypting encrypted versions of the first and second sets of data using the received first and second utilization permit keys, wherein the first and second sets of data are decrypted for performance of only the one or more use types that are permitted, respectively, by the first and second utilization permit keys;
wherein the first utilization permit key is one of a first plurality of utilization permit keys for the first set of data, wherein the first plurality of utilization permit keys are arranged in a hierarchy in which a given one of the first plurality of utilization permit keys permits a first corresponding use type of the first set of data as well as any use types that are permitted by any utilization permit keys that are lower in the hierarchy; and wherein the second utilization permit key is one of a second plurality of utilization permit keys for the second set of data, wherein the second plurality of utilization permit keys are arranged according to the hierarchy such that a given one of the second plurality of utilization permit keys permits a second corresponding use type of the second set of data as well as any use types that are permitted by any utilization permit keys that are lower in the hierarchy;
wherein the first and second corresponding use types are different.

13. The method of claim 12, wherein the decrypting includes the use of a copyright control program, wherein the copyright control program ensures the decrypting is for performance of only the one or more use types that are permitted, respectively, by the first and second utilization permit key.

14. The method of claim 12, wherein the first utilization permit key permits at least displaying, editing, storing, copying, or transferring of the first set of data, as well any use types permitted by utilization permit keys that are lower in the hierarchy.

15. The method of claim 12, further comprising a copyright control program limiting a number of times the first set of data is used by the user device.

16. The method of claim 12, further comprising a copyright control program limiting a number of times the first utilization permit key is used by the user device.

17. The method of claim 12, further comprising a copyright control program maintaining copyright information on the first set of data.

18. The method of claim 17, wherein the copyright information includes history information on authorship of the first set of data.

19. The method of claim 13, further comprising receiving the copyright control program at the user device with the first utilization permit key.

20. The method of claim 13, further comprising receiving the copyright control program at the user device with the encrypted version of the first set of data.

21. The method of claim 12, wherein the first utilization permit key is an editing permit key whose corresponding permitted use type is editing of the first set of data, wherein the editing permit key also permits display of the first set of data.

22. An article comprising: a computer readable storage medium having stored thereon instructions that, if executed by a user device, cause the user device to:

receive at a user device first and second utilization permit keys associated, respectively, with first and second sets of digital data, wherein the first utilization permit key is usable to perform cryptographic operations on the first set of data and configured to permit one or more of the following uses of the first set of data: displaying, editing, storing, copying, transferring, wherein the second utilization permit key is usable to perform cryptographic operations on the second set of data and configured to permit one or more of the following uses of the second set of data: displaying, editing, storing, copying, transferring;

wherein the first utilization permit key is one of a first plurality of utilization permit keys that are arranged in a hierarchy such that the first utilization permit key also permits uses that are permitted by any of the first plurality of utilization permit keys that are lower in the hierarchy;

wherein the second utilization permit key is one of a second plurality of utilization permit keys that are arranged according to the hierarchy such that the second utilization permit key also permits uses that are permitted by any of the second plurality of utilization permit keys that are lower in the hierarchy; and wherein the one or more uses permitted by the first utilization permit key and the one or more uses permitted by the second utilization permit key are not identical;

decrypt encrypted versions of the first and second sets of data using the first and second utilization permit keys; and use the first and second sets of data according to the one or more uses that are permitted, respectively, by the first and second utilization permit key.

23. The article of claim 22, wherein said instructions, if executed, further cause a copyright control program on the user device to display a copyright control message when the user device attempts a use of the first set of data that is different from the one or more uses that are permitted by the first utilization permit key.

24. The article of claim 22, wherein said instructions, if executed, further cause a copyright control program on the user device to limit a number of times the first set of data is used by the user device.

25. The article of claim 22, wherein said instructions, if executed, further cause a copyright control program on the user device to limit a number of times the first utilization permit key is used by the user device.

26. The method of claim 1, wherein the first utilization permit key is an editing permit key that permits displaying and editing of the first set of data.

27. The method of claim 1, wherein displaying data is the lowest use type in the hierarchy.

28. The method of claim 12, wherein the first plurality of utilization permit keys includes a display permit key that permits displaying the first set of data and an edit permit key that permits editing and displaying the first set of data.

29. The method of claim 12, wherein the first plurality of utilization permit keys includes a storage permit key that permits storing the first set of data and a copy permit key that permits copying and storing the first set of data.

30. The method of claim 12, wherein the cryptographic operations include decrypting and reencrypting.

31. The method of claim 12, wherein the first plurality of utilization permit keys includes a display permit key that is the lowest permit key in the hierarchy.

32. The article of claim 22, wherein the first plurality of utilization permit keys includes a display permit key that permits displaying the first set of data and an edit permit key that permits editing and displaying the first set of data.

33. The article of claim 22, wherein the first plurality of utilization permit keys includes a storage permit key that permits storing the first set of data and a copy permit key that permits copying and storing the first set of data.

34. The article of claim 22, wherein the first plurality of utilization permit keys includes a copy permit key that permits copying the first set of data and a transfer key that permits transferring and copying the first set of data.

35. The article of claim 22, wherein the first plurality of utilization permit keys includes a display permit key that is the lowest permit key in the hierarchy.

* * * * *

UNITED STATES PATENT AND TRADEMARK OFFICE
CERTIFICATE OF CORRECTION

PATENT NO. : 7,730,324 B2
APPLICATION NO. : 09/985279
DATED : June 1, 2010
INVENTOR(S) : Makoto Saito It is certified that error appears in the above-identified patent and that said Letters Patent is hereby corrected as shown below:

On the Title Page

Item (63)   please add "Continuation of application of 08/895,493, filed on July 16, 1997, now Pat. No. 7,447,914, which is a continuation of application No. 08/416,037, filed March 31, 1995, now abandoned".

Column 1

Lines 1-2, please delete "METHOD FOR CONTROLLING DATABASE COPYRIGHTS" and substitute -- METHOD FOR CONTROLLING DATABASE COPYRIGHTS - This application is a continuation of prior application Serial No. 08/895,493 filed on July 16, 1997, now Pat. No. 7,447,914, which is a Continuation of prior application Serial No. 08/416,037, filed March 31, 1995, now abandoned. --.

Column 9

Line 54, please delete "the method flirt her comprises" and substitute -- the method further comprises --.

Signed and Sealed this

Thirty-first Day of August, 2010

David J. Kappos
*Director of the United States Patent and Trademark Office*